US012517536B2

(12) United States Patent
Buryanec

(10) Patent No.: US 12,517,536 B2
(45) Date of Patent: Jan. 6, 2026

(54) VOLTAGE REGULATOR BYPASS MODE CONTROL CIRCUIT

(71) Applicant: STMicroelectronics International N.V., Geneva (CH)

(72) Inventor: Lukas Buryanec, Trutnov (CZ)

(73) Assignee: STMicroelectronics International N.V., Geneva (CH)

( * ) Notice: Subject to any disclaimer, the term of this patent is extended or adjusted under 35 U.S.C. 154(b) by 265 days.

(21) Appl. No.: 18/335,797

(22) Filed: Jun. 15, 2023

(65) Prior Publication Data

US 2024/0419201 A1 Dec. 19, 2024

(51) Int. Cl.
*G05F 1/575* (2006.01)
*G05F 1/46* (2006.01)
*G05F 1/573* (2006.01)

(52) U.S. Cl.
CPC .............. *G05F 1/575* (2013.01); *G05F 1/462* (2013.01); *G05F 1/573* (2013.01)

(58) Field of Classification Search
CPC ........... G05F 1/575; G05F 1/573; G05F 1/462
See application file for complete search history.

(56) References Cited

U.S. PATENT DOCUMENTS 7,212,067 B2 * 5/2007 Pasternak ............... G06F 1/305 327/541
9,098,101 B2 8/2015 Naidu et al.
9,454,164 B2 9/2016 Bhattad
9,893,632 B2 2/2018 Freeman et al.
11,277,066 B2 3/2022 Chang
11,476,806 B2 10/2022 Ng et al.
2002/0176305 A1 * 11/2002 Kono ..................... G11C 5/147 365/226
2005/0024128 A1 * 2/2005 Pasternak ............... G06F 1/305 327/541
2014/0103890 A1 * 4/2014 Naidu ....................... G05F 1/10 323/269
2015/0077076 A1 * 3/2015 Bhattad ..................... G05F 1/56 323/280
2022/0077783 A1 * 3/2022 Khamesra ........... H02M 1/0019
2022/0181971 A1 6/2022 Mitev

FOREIGN PATENT DOCUMENTS

CN 113765353 A 12/2021

* cited by examiner

*Primary Examiner* — Sisay G Tiku
(74) *Attorney, Agent, or Firm* — Slater Matsil, LLP

(57) ABSTRACT

A voltage regulator circuit includes an input configured to receive an input voltage, an output configured to produce a regulated output voltage, a pass element coupled between the input and the output, a bypass element coupled in parallel with the pass element, a feedback divider coupled between the output and a ground node, an error amplifier coupled between a control node of the pass element and the feedback divider, and a dropout transition control circuit coupled to the feedback divider configured to activate a dropout mode of the voltage regulator circuit by controlling a dropout transition at the output from the regulated output voltage to a dropout voltage level to limit inrush current. The feedback divider is configured to produce a feedback signal indicative of the output voltage. The error amplifier is configured to minimize the difference between a reference and the feedback signal.

20 Claims, 11 Drawing Sheets

VOLTAGE REGULATOR BYPASS MODE CONTROL CIRCUIT

TECHNICAL FIELD

The present invention relates generally to analog power electronic circuits, and, in particular embodiments, to structures of voltage regulator circuits including a bypass mode, and methods of operation thereof.

BACKGROUND

Linear voltage regulators (such as low-dropout regulators, or LDOs) can work in two different modes: normal regulation mode during which the LDO ideally maintains a constant output voltage, and so-called dropout mode, where the output voltage is below the nominal regulated level. In the dropout mode, the pass element (e.g., a power transistor) works in the linear region (i.e., is fully open) and the output voltage approaches the input voltage.

In some specific applications, it can be desirable to activate the dropout mode “manually” by the user even during normal regulation mode. When this occurs, the output voltage rises from the regulation level and approaches the input voltage in order to reach the minimal voltage difference between the input and output voltages.

To reduce the minimal voltage difference between in input voltage of the voltage regulator (VIN) and the output voltage of the voltage regulator (VOUT) when dropout mode is activated, a bypass element can be connected in parallel with the pass element. When the bypass element is turned on (so-called bypass mode), the additional current path causes the voltage drop to decrease.

Switching to bypass mode also introduces undesirable inrush currents. Moreover, there is no available overcurrent protection (OCP) when the bypass mode is activated. Therefore, linear voltage regulators that decrease these undesirable characteristics when dropout mode is manually activated are desirable.

SUMMARY

In accordance with an embodiment of the invention, a voltage regulator circuit includes an input node configured to receive an input voltage, an output node configured to produce a regulated output voltage, a pass element coupled between the input node and the output node, a bypass element coupled in parallel with the pass element, a feedback divider coupled between the output node and a ground node, an error amplifier circuit coupled between a control node of the pass element and the feedback divider, and a dropout transition control circuit coupled to the feedback divider. The feedback divider being configured to produce a feedback signal indicative of the regulated output voltage. The error amplifier circuit is configured to minimize a voltage difference between a reference voltage and the feedback signal. The dropout transition control circuit is configured to activate a dropout mode of the voltage regulator circuit by controlling a dropout transition at the output node from the regulated output voltage to a dropout voltage level to limit inrush current.

In accordance with another embodiment of the invention, a method of activating a bypass mode of a voltage regulator includes producing a regulated output voltage at an output node of a voltage regulator, activating a dropout mode of the voltage regulator by controlling a dropout transition from the regulated output voltage to a dropout voltage level to limit inrush current using a dropout transition control circuit coupled to a feedback divider coupled between the output node and a ground node, and activating a bypass mode of the voltage regulator by turning on a bypass element coupled in parallel with a pass element coupled between the output node and an input node of the voltage regulator.

In accordance with still another embodiment of the invention, a voltage regulator circuit includes an input node configured to receive an input voltage, an output node configured to produce a regulated output voltage, a pass element and a bypass element coupled in parallel between the input node and the output node, an OCP pass element and an OCP bypass element coupled to the input node in parallel, a bypass transition control circuit including a soft gate connection switch, and an OCP control circuit including a delayed hard gate connection switch. A control node of the OCP pass element is coupled to a control node of the pass element. A control node of the OCP bypass element is coupled to a control node of the bypass element. The soft gate connection switch of the bypass transition control circuit is coupled between the control node of the pass element and the control node of the bypass element. The soft gate connection switch is configured to activate a bypass mode of the voltage regulator circuit by controlling a bypass transition at the output node to limit inrush current while turning on the bypass element. The delayed hard gate connection switch of the OCP control circuit is coupled between the control node of the pass element and the control node of the bypass element. The delayed hard gate connection switch is configured to provide a low resistance connection between the control nodes immediately during an overcurrent event or after a delay triggered by the activation of the bypass mode.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
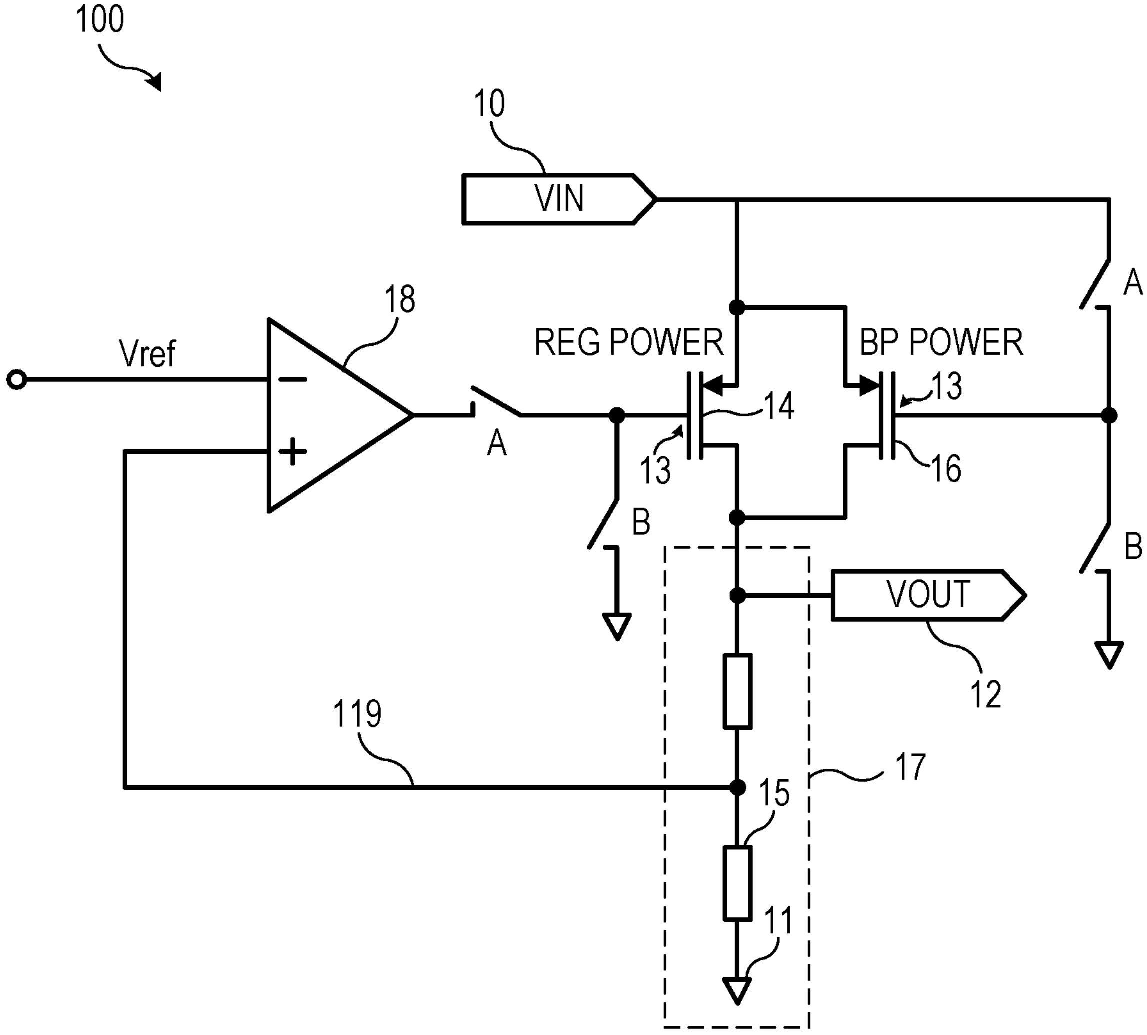
FIG. 1 illustrates an example voltage regulator circuit having a pass element coupled in parallel with a bypass element and that includes a comparison circuit (such as an error amplifier circuit) coupled to a control node of the pass element and configured to compare a reference voltage to a feedback signal.

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope. Unless specified otherwise, the expressions "around", "approximately", and "substantially" signify within 10%, and preferably within 5% of the given value or, such as in the case of substantially zero, less than 10% and preferably less than 5% of a comparable quantity.

When activating or deactivating bypass mode for a voltage regulator (e.g., a linear voltage regulator such as an LDO), it is important to have the whole sequence under control. Conventional methods of switching to and from bypass mode employ a "hard" switching solution. That is, connections are made in a binary fashion causing rapid changes in voltage levels without caring about the details of the transition. This results in large inrush currents that can be potentially dangerous to the both the voltage regulator (as well as surrounding circuitry, such as a power management integrated circuit (IC), etc.) and also to systems supplied by the voltage regulator. As a result, a solution that controls the transition between normal regulation mode and bypass mode so that inrush currents are reduced and/or minimized may be desirable.

Additionally, conventional solutions do not provide any OCP functionality. It may be desirable to have an OCP function to ensure that the components remain protected from overcurrent events while activating and deactivating bypass mode, as well as while in bypass mode. However, if the solution is too complex, it may make OCP function during bypass mode impractical, thereby prohibiting the functionality altogether. Consequently, it may be desirable to have a simple solution that controls the usage of the already available OCP function of the voltage regulator itself.

There are options from reducing the minimal voltage difference between VIN and VOUT when dropout mode is enabled. Simply increasing the size of the pass and bypass elements can decrease the difference, but this has many disadvantages such as widespread changes to regulation parameters, decreased stability, and worsened transient responses of the voltage regulator. The bypass element can also be connected in parallel at the right moment, but this cannot be done while in normal regulation mode (e.g., because of high open-loop gain which can cause possible oscillations).

In various embodiments, the invention provides a way to implement a bypass mode in a voltage regulator that can be activated even during normal operation (regulation mode) of the voltage regulator while reducing, minimizing, or eliminating undesirable effects, such as high inrush currents and lack of protection from overcurrent events (OCP functionality), associated with conventional solutions.

In various embodiments, a voltage regulator circuit includes a voltage input node and a regulated voltage output node. A pass element is coupled between the input node and the output node. A bypass element is coupled in parallel with the pass element. The voltage regulator circuit also includes a feedback divider coupled between the output node and a ground node. A comparison circuit is coupled to a control node of the pass element. The comparison circuit is configured to compare a reference voltage to a feedback signal produced by the feedback circuit. The error amplifier controls the pass element in order to keep minimal voltage difference between the reference voltage and the feedback signal that is indicative of the voltage at the regulated output node.

A dropout transition control circuit may be included in the voltage regulator circuit coupled to the feedback divider. The dropout transition control circuit is configured to activate the dropout mode of the voltage regulator circuit by controlling the dropout transition voltage at the output node of the voltage regulator circuit (i.e. a "soft" transition as opposed to an uncontrolled "hard" transition). For example, the controlled dropout transition voltage may have a more gradual transition between the regulated voltage the dropout voltage level than an uncontrolled transition. The controlled dropout transition voltage may thereby advantageously limit inrush current during the transition to dropout mode.

A bypass transition control circuit may also be included in the voltage regulator circuit. The bypass transition control circuit may include a switch coupled between the control node of the pass element and a control node of the bypass element. The switch may be configured to activate a bypass mode of the voltage regulator circuit by controlling the bypass transition voltage at the output node of the voltage regulator circuit (i.e. a "soft" transition in contrast to a "hard" transition). Similar to the controlled dropout transition voltage, the controlled bypass transition voltage may have a more gradual transition than an uncontrolled transition. In this way, the controlled bypass transition voltage may advantageously limit inrush current during the transition to bypass mode.

An OCP control circuit including an additional switch coupled between the control node of the pass element and the control node of the bypass element. For example, the switch of the bypass transition circuit may be a "soft" switch, while the additional switch of the OCP control circuit may be a "hard" switch. The additional switch may be configured to provide a low resistance connection between control nodes immediately during an overcurrent event or after a delay triggered by the activation of the bypass mode. For instance, during the bypass mode transition, the control nodes may be connected through a resistor, whereas after the bypass mode transition, the control nodes may be shorted.

Embodiment voltage regulation circuits described herein may advantageously enable activation of bypass mode without introducing risky conditions associated with so-called "hard" start solutions. For example, high inrush currents occurring when switching to and from bypass mode may advantageously be reduced or eliminated. That is, a so-called "soft" activation/deactivation of the bypass mode may be advantageously provided. This may have the advantage of an activation/deactivation sequence that is fully under control (e.g., in contrast to conventional solutions that completely ignore details of the transition between modes).

Additionally, the embodiment voltage regulation circuits may beneficially alleviate the need to simply increase the size of elements such as power transistors (e.g., power metal-oxide-conductor field-effect transistors, or MOSFETs) in order to decrease the voltage different between VIN and VOUT of the voltage regulator during bypass mode. This may advantageously avoid altering some or all of the voltage regulation parameters. Moreover, stability issues caused by the larger components may also be avoided. As a further benefit, worsened transient responses from larger components may also be prevented.

Another potential advantage of embodiment voltage regulation circuits described herein is to enable protection from overcurrent events (OCP functionality) for the voltage regulator (e.g., an LDO) that can be used even when the bypass mode is activated. Further, existing OCP circuitry of the voltage regulator may be used, advantageously removing any need for an additional OCP circuit or controller.

Embodiments provided below describe various voltage regulation circuits, and in particular, voltage regulation circuits that include one or more control circuits configured to control transitions to and from a bypass mode of the voltage regulation circuit. The following description describes the embodiments. FIG. 1 is used to describe an example voltage regulation circuit. An example graph of transition voltage when bypass mode is enabled is provided in FIG. 2. Another example voltage regulation circuit is described using FIG. 3. Two example dropout transition control circuits are described using FIGS. 4 and 5. Three more example voltage regulation circuits are described using FIGS. 6-8. Four example transitions are described using qualitative graphs in FIGS. 9-12 and FIG. 13 is used to describe an example method of activating bypass mode of a voltage regulator.

FIG. 1 illustrates an example voltage regulator circuit having a pass element coupled in parallel with a bypass element and that includes a comparison circuit (such as an error amplifier circuit) coupled to a control node of the pass element and configured to compare a reference voltage to a feedback signal.

Referring to FIG. 1, a voltage regulator circuit 100 includes an input node 10 and a output node 12 with a pass element 14 (e.g., a transistor) coupled therebetween. A feedback divider 17 is coupled between the output node 12 and a ground node 11. A comparison circuit 18 (e.g., including an error amplifier as shown) is coupled between a control node 13 (e.g., a gate of a FET, base of a bipolar junction transistor (BJT), etc.) of the pass element 14 and feedback divider 17, as shown. For example, the feedback divider 17 may include a resistor 15 (e.g., at least two) that are configured to output a voltage that is a predefined fraction of the input voltage.

During operation, the voltage regulator circuit 100 receives an input voltage VIN at the input node 10 and regulates the input voltage VIN to produce a regulated output voltage VOUT at the output node 12 by minimizing a voltage difference between a reference voltage Vref and a feedback signal 119 from the feedback divider 17 using the comparison circuit 18. That is, the comparison circuit 18 is configured to maintain low voltage (ideally zero voltage) between the reference voltage Vref and the feedback signal 119. This may be referred to as the regulation mode of the voltage regulator circuit 100. In various embodiments, the voltage regulator circuit 100 is a linear regulator (such as in a series configuration or a shunt configuration), and is a low-dropout regulator (LDO) in one embodiment.

In addition to the regulation mode, the voltage regulator circuit 100 may also operate in dropout mode (e.g., when the difference between VIN and VOUT decreases to below the minimum voltage required to maintain regulation). When the voltage regulator circuit 100 is in dropout mode, the voltage drop across the pass element 14 (e.g., the power transistor) is determined by its resistance (e.g., the drain-source resistance (RDSon value) of the power MOSFET when operated in the linear region).

The resistance of the path between the input node 10 and the output node 12 (including the pass element 14) may be further reduced by including a bypass element 16 in the voltage regulator circuit 100 coupled in parallel with the pass element 14 between the input node 10 and the output node 12. For example, when turned on (e.g. during dropout mode, when there is little or no open-loop gain), the bypass element 16 is configured to provide an additional current path from the input node 10 to the output node 12 thereby reducing the voltage difference between VIN and VOUT. This may be referred to as the bypass mode of the voltage regulator circuit 100. Bypass mode may be activated after dropout mode is manually activated.

Switches may be included to control the voltage received at the control nodes of the pass element 14 and/or of the bypass element 16. For example, as shown, switches A may control the connection of the output of the comparison circuit 18 to the control gate of the pass element 14 and the connection of VIN to the control gate of the bypass element 16. Similarly, switches B may control the connection of the control gates of the pass element 14 and the bypass element 16 with the ground node 11.

The pass element 14 and the bypass element 16 may be switch-like components configured to control the flow of current using respective control nodes. For example, the pass element 14 and the bypass element 16 may be implemented as transistors, such as power transistors. In various embodiments, the pass element 14 is a FET and the pass element 14 is a MOSFET in one embodiment. The bypass element 16 may be similar to the pass element 14, but may have different device parameters. For example, the bypass element 16 may also be a power MOSFET, but may have different area, channel length, doping, etc. Of course, the pass element 14 and the bypass element 16 may also be implemented using other component types, such as a BJT, an insulated-gate bipolar transistor (IGBT), a thyristor, and others.

Figure 2:
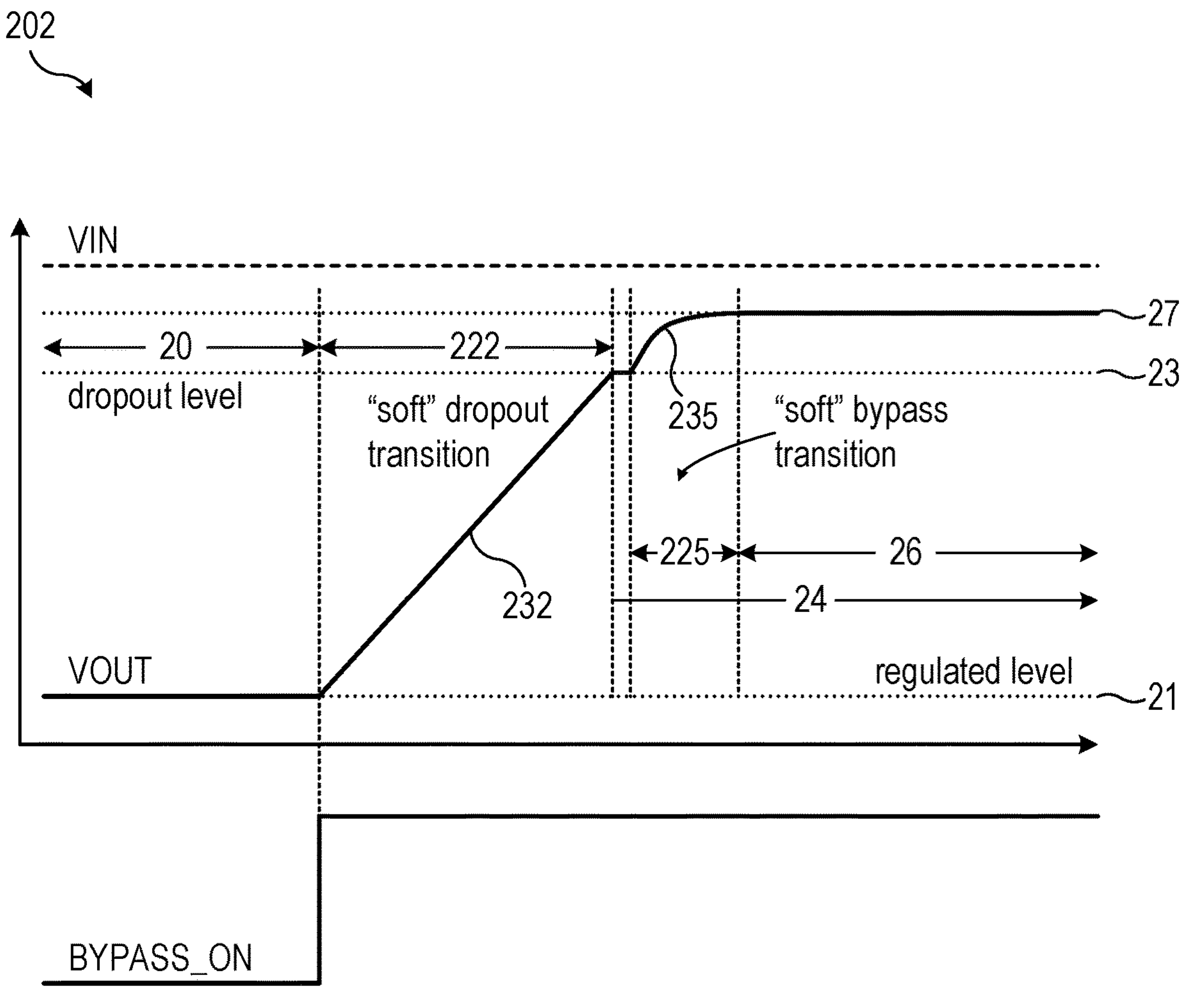
FIG. 2 illustrates an example qualitative graph showing output voltage of a voltage regulator during controlled transitions to dropout mode and bypass mode of the voltage regulator in accordance with embodiments, of the invention.

FIG. 2 illustrates an example qualitative graph showing output voltage of a voltage regulator during controlled transitions to dropout mode and bypass mode of the voltage regulator in accordance with embodiments, of the invention. The qualitative graph of FIG. 2 may be a qualitative representation of the behavior of various voltage regulators (i.e. voltage regulation circuits) described herein. Similarly labeled elements may be as previously described.

Referring to FIG. 2, a qualitative graph 202 shows the input voltage VIN and the corresponding output voltage VOUT of a voltage regulator as a function of time. During a regulation mode 20 of the voltage regulator, VOUT is at a regulated voltage level 21. A bypass enable signal BYPASS_ON that may be in either a low state (e.g., logical "0") or a high state (e.g., logical "1") is also shown below the graph of VOUT. For example, BYPASS_ON is in the low state during the regulation mode 20 indicating that the bypass mode of the voltage regulated has not been enabled.

When BYPASS_ON is changed to the high state, the voltage regulator enters a dropout transition 222 characterized by a dropout transition voltage 232 of VOUT. Once the dropout transition voltage 232 (VOUT) reaches a dropout voltage level 23, the voltage regulator is in a dropout mode 24. As shown, the dropout transition voltage 232 is a so-called "soft" dropout transition that gradually transitions from the regulated voltage level 21 to the dropout voltage level 23. That is, a so-called "hard" transition may be a substantially instantaneous voltage transition (e.g., resembling a step function at the shown timescale). In contrast, the soft dropout transition illustrated by dropout transition voltage 232 is a controlled, gradual transition from the regulation mode 20 to the dropout mode 24 (i.e., relative to an uncontrolled voltage transition).

In one embodiment, the shape of the dropout transition voltage 232 is a substantially linear voltage curve (e.g., the "linearization" of the uncontrolled voltage curve). The substantially linear voltage curve may advantageously limit (i.e. reduce and/or eliminate) undesirable inrush current during the dropout transition 222 after dropout mode 24 is activated. However, other shapes for the dropout transition voltage 232 may be utilized. The rate of the voltage transition during the dropout transition 222 (e.g., the slope of the substantially linear voltage curve) may be controlled by control circuitry (e.g., dropout transition control circuitry) included in the voltage regulator. For example, the rate of the dropout transition 222 may be chosen to limit the inrush current to a desired range, the details of which may be determined by the specific capabilities of components in the voltage regulator, such as a pass element (e.g., power transistor).

After the voltage regulator is in dropout mode 24, the voltage regulator enters a bypass transition 225 characterized by a bypass transition voltage 235. During the bypass transition 225, the bypass transition voltage 235 (VOUT) transitions from the dropout voltage level 23 to a bypass voltage level 27 and the voltage regulator is in a bypass mode 26. Similar to the soft dropout transition in dropout transition 222, the bypass transition voltage 235 is a so-called "soft" bypass transition. In one embodiment, the shape of the bypass transition voltage 235 is a substantially exponential voltage curve approaching the bypass voltage level 27, but of course other shapes are also possible.

The soft bypass transition illustrated by the bypass transition voltage 235 is a controlled, gradual transition from the dropout mode 24 to the bypass voltage level 27 (i.e. relative to an uncontrolled voltage transition). It should be noted that the uncontrolled voltage transition may resemble a step function at the illustrated timescale, but may appear as a substantially exponential voltage curve at a much smaller timescale. That is, the soft transitions described herein may have a different shape and different rate than the hard (i.e. uncontrolled) transitions or may have the same shape, but a different (i.e. slower) rate. For example, the rate of the bypass transition 225 (e.g., the time constant of the substantially exponential voltage curve) may be controlled by control circuitry (e.g., bypass transition control circuitry) including resistive and capacitive elements in the voltage regulator to change the RC constant to a desired value. Similar to the rate of the dropout transition 222, the rate of the bypass transition 225 may be chosen to limit the inrush current to a desired range, which may be specific to the details of specific voltage regulator implementation.

Figure 3:
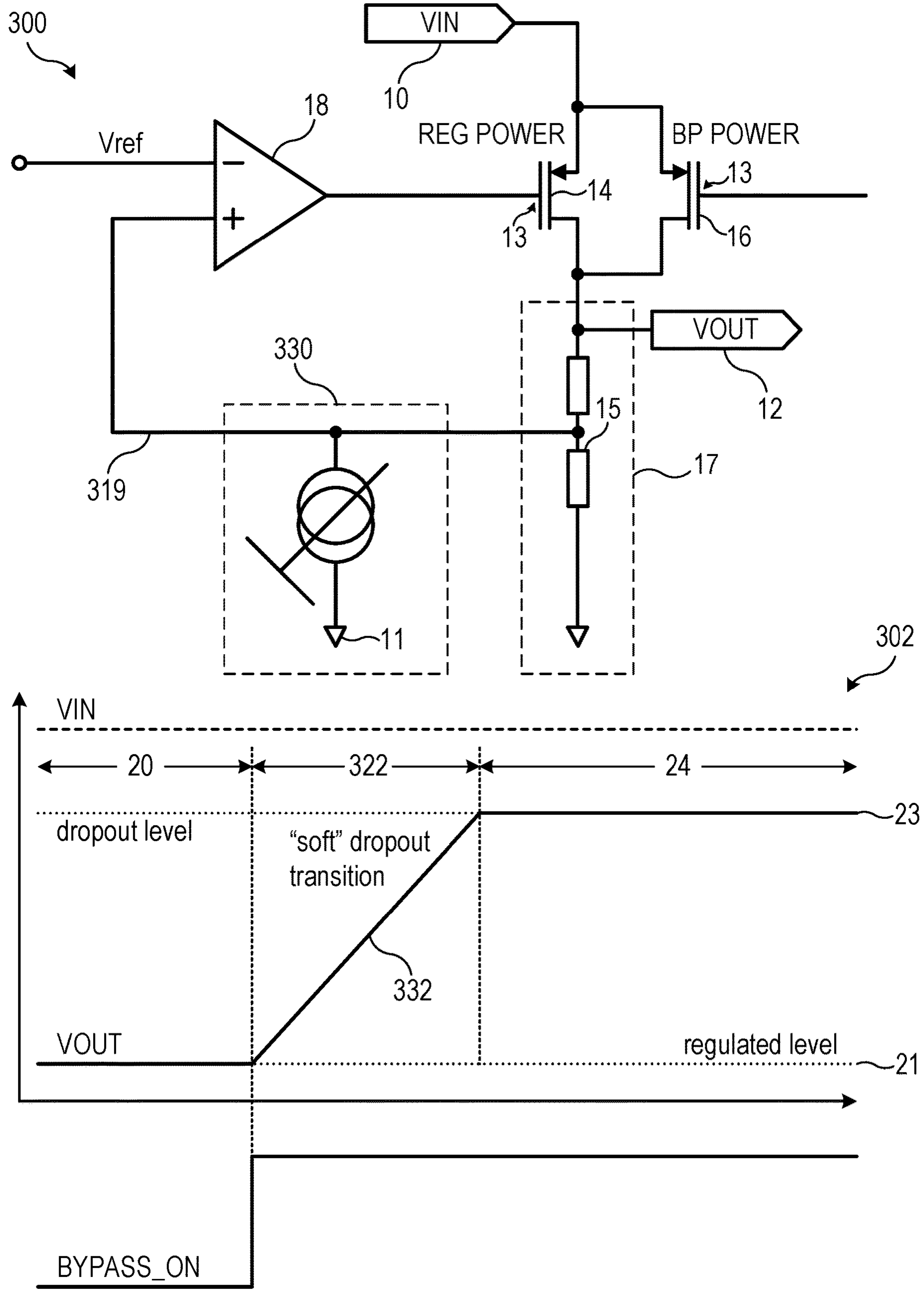
FIG. 3 illustrates an example voltage regulator circuit that includes a dropout transition control circuit coupled to a feedback divider and a corresponding qualitative graph showing output voltage of the voltage regulator circuit during a controlled dropout transition in accordance with embodiments of the invention.

FIG. 3 illustrates an example voltage regulator circuit that includes a dropout transition control circuit coupled to a feedback divider and a corresponding qualitative graph showing output voltage of the voltage regulator circuit during a controlled dropout transition in accordance with embodiments of the invention. The voltage regulator circuit of FIG. 3 may be a specific implementation of other voltage regulator circuits or combined with other voltage regulator circuits described herein. Similarly labeled elements may be as previously described.

Referring to FIG. 3, a voltage regulator circuit 300 includes a pass element 14 coupled between an input node 10 and an output node 12. As before, a feedback divider 17 is coupled to the output node 12 and a comparison circuit 18 (e.g., including an error amplifier, as shown) receives a feedback signal 319 from the feedback divider 17 which is used together with the reference voltage Vref to regulate the output voltage VOUT at the output node 12. However, in contrast to the voltage regulator circuit 100 of FIG. 1, a dropout transition control circuit 330 is included in the voltage regulator circuit 300 coupled between the feedback divider 17 and the comparison circuit 18.

The dropout transition control circuit 330 is configured to manually transition the voltage regulator circuit 300 to dropout mode 24 from regulation mode 20 by providing a controllable alternative path to the ground node 11 thereby altering the resistance of the feedback divider 17 in a controlled manner. Specifically, the dropout transition control circuit 330 is configured to implement the dropout transition 322 (a soft dropout transition), as illustrated in corresponding qualitative graph 302. For this reason, the dropout transition control circuit 330 may be considered to be or include a voltage ramp circuit. For example, the dropout transition control circuit 330 may include a switching element, such as a transistor, which may be turned on in a controlled manner (e.g., slowly relative to instantaneous switching).

It should be noted that here and in the following a convention has been adopted for brevity and clarity wherein elements adhering to the pattern [x22] where 'x' is the figure number may be related implementations of a dropout transition in various embodiments. For example, the dropout transition 322 may be similar to the dropout transition 222 except as otherwise stated. An analogous convention has also been adopted for other elements as made clear by the use of similar terms in conjunction with the aforementioned numbering system.

In theory, rather than decreasing the resistance of the feedback divider 17, Vref may also be slowly increased to provide a similar effect. However, this may not be possible in practice because the complementary differential pair of the voltage regulator may be important for the operation of the voltage regulator circuit 300. Consequently, the dropout transition control circuit 330 has the advantage of enabling the manual activation of dropout mode 24 while still maintaining desired functionality of the voltage regulator circuit 300.

The qualitative graph 302 shows the dropout transition 322 as being activated using the BYPASS_ON signal. For example, this could be turning the bypass mode of the voltage regulator circuit 300 on during normal operation (i.e., regulation mode 20). However, the specifics of the dropout transition 322 of voltage regulator circuit 300 are not exclusive to situations where dropout mode 24 is enabled with the intention of subsequently entering a bypass mode (such as in qualitative graph 202, for example). For example, as shown in qualitative graph 302, the dropout transition control circuit 330 is simply be used to limit the inrush current during the dropout transition 322 and does not require a bypass mode at all.

Figure 4:
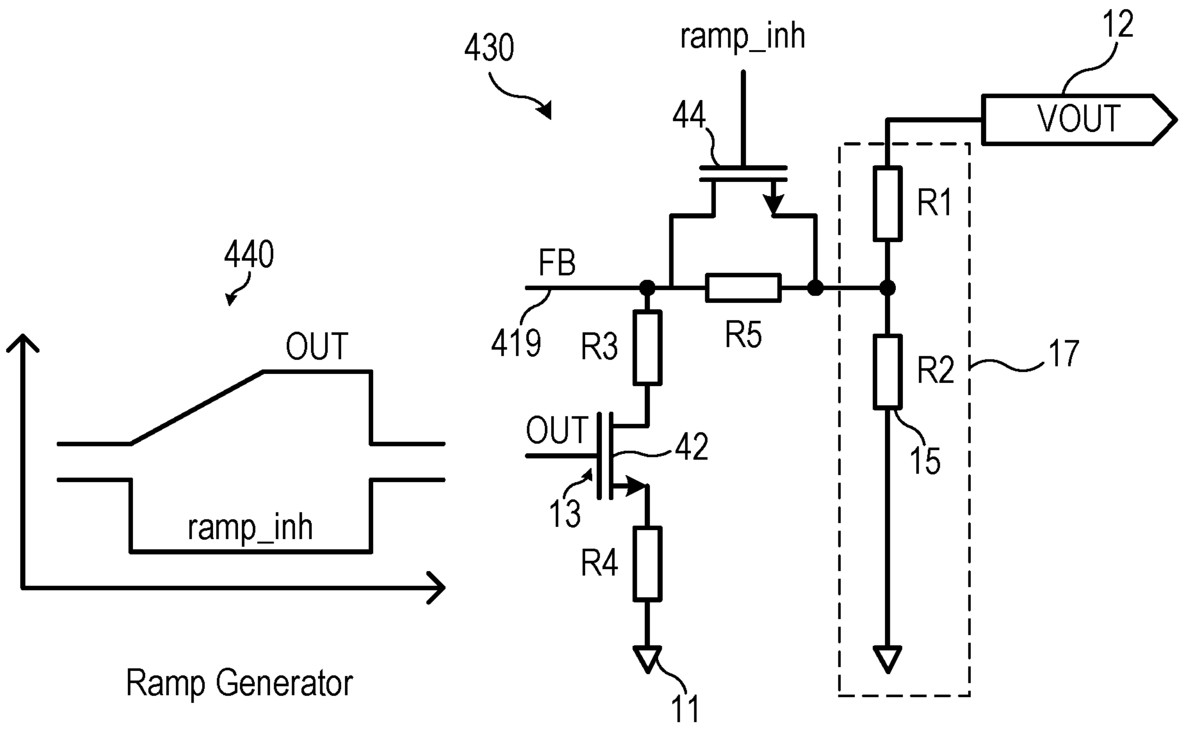
FIG. 4 illustrates an example dropout transition control circuit that includes a ramp generator circuit coupled to a ramp control element in accordance with embodiments of the invention.

FIG. 4 illustrates an example dropout transition control circuit that includes a ramp generator circuit coupled to a ramp control element in accordance with embodiments of the invention. The dropout transition circuit of FIG. 4 may be a specific implementation of other dropout transition circuits described herein, such as the dropout transition circuit of FIG. 3, for example. Similarly labeled elements are as previously described.

Referring to FIG. 4, a dropout transition control circuit 430 includes a feedback divider 17 coupled between a output node 12 and a ground node 11. In addition to resistor R1 and resistor R2 of the feedback divider 17, the feedback network is expanded to include additional resistors. For example, a ramp control element 42 is coupled between the feedback divider 17 and the ground node 11 bracketed by a resistor R3 and a resistor R4. A ramp generator circuit 440 is also included that is configured to generate a ramping voltage at an output OUT coupled to the ramp control element 42. The ramping voltage may correspond to a signal received at an input of the ramp generator circuit 440, such as a ramp inhibit signal (ramp_inh) as illustrated.

Another resistor R5 may also be included between the resistor R3 and the feedback divider 17. A ramp bypass element 44 may be coupled in parallel with the resistor R5. The ramp bypass element 44 may be controlled by the same signal as the ramp generator circuit 440 (e.g., ramp_inh). However, if the resistance of the resistor R1 high enough, the resistor R5 may not be included and the connection between R3 and the feedback divider 17 may be instead shorted.

The dropout transition control circuit 430 is configured to slowly turn on ramp control element 42 using OUT generated by the ramp generator circuit 440. When VOUT increases, the output capacitor may be charged by a current (e.g., with maximum rate $dV/dT=I_{LIM}/C_{OUT}$ where the $I_{LIM}$ is the maximal allowed load current (OCP limitation current) and $C_{OUT}$ is the output capacitance of the voltage regulator. The dropout transition control circuit 430 may be advantageously simple to implement while still achieving the desired limitation on inrush current.

Figure 5:
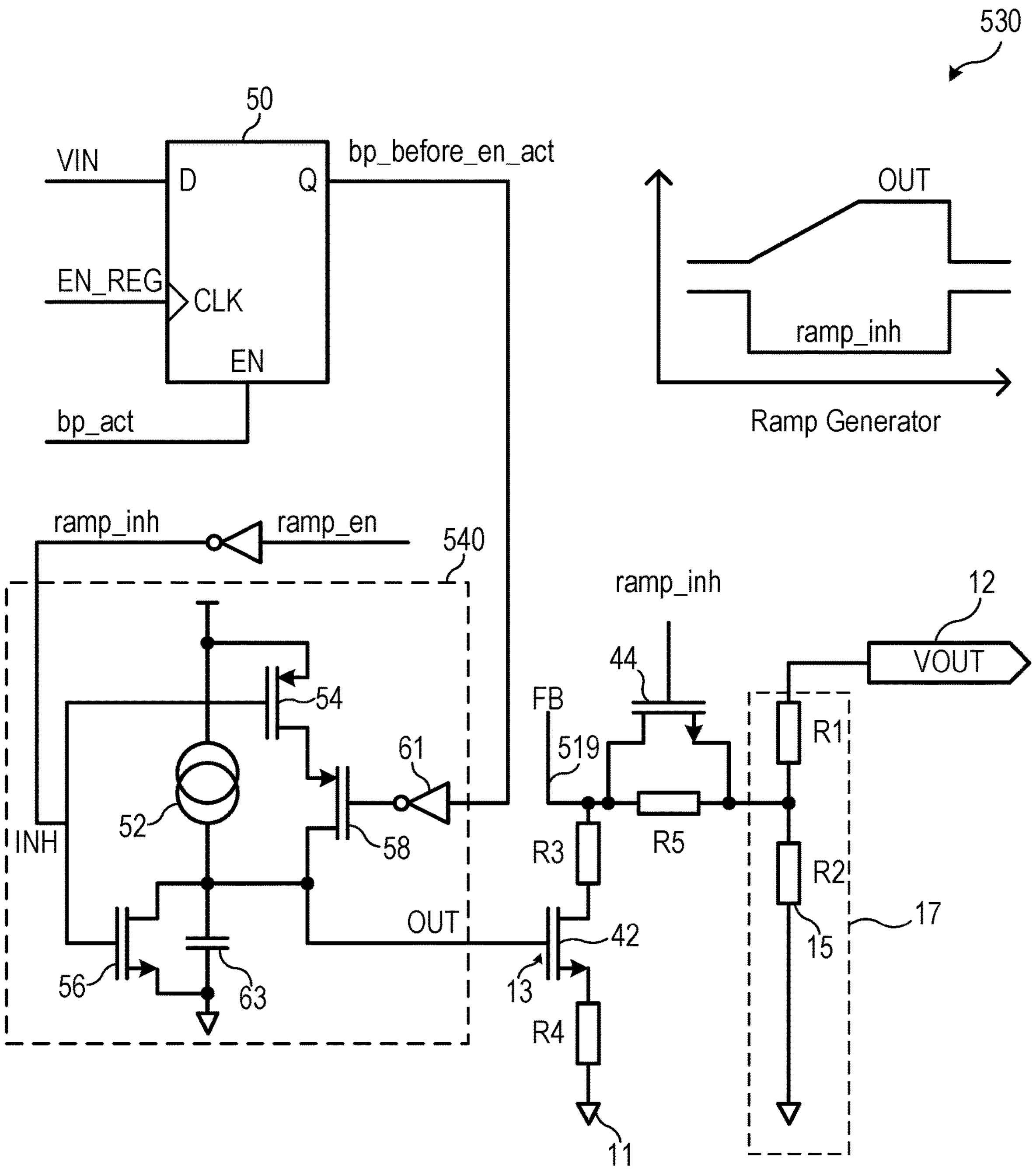
FIG. 5 illustrates another example dropout transition control circuit that includes a ramp generator circuit coupled to a ramp control element, the ramp generator circuit including a current source in accordance with embodiments of the invention.

FIG. 5 illustrates another example dropout transition control circuit that includes a ramp generator circuit coupled to a ramp control element, the ramp generator circuit including a current source in accordance with embodiments of the invention. The dropout transition circuit of FIG. 5 may be a specific implementation of other dropout transition circuits described herein, such as the dropout transition circuit of FIG. 3, for example. Similarly labeled elements are as previously described.

Referring to FIG. 5, a dropout transition control circuit 530 includes a feedback divider 17 coupled between a output node 12 and a ground node 11. As previously discussed, the feedback divider 17 is expanded to include a feedback network that includes a ramp control element 42, additional resistors, and a ramp bypass element 44. A ramp generator circuit 540 is coupled to the control node 13 of the ramp control element 42.

The ramp generator circuit 540 includes an input INH that receives a signal ramp_inh. An inverter 61 may be included to invert a ramp enable signal (ramp_en) to provide the ramp inhibit signal (ramp_inh) at the input INH. The ramp generator circuit 540 further includes a current source 52 and a capacitor 63 coupled in series between a power source and the ground node 11.

A first inhibit switch 54 is coupled in parallel with the current source 52 while a second inhibit switch 56 is coupled in parallel with the capacitor 63. Both the first inhibit switch 54 and the second inhibit switch 56 include control nodes that are coupled to INH (and are therefore controlled by the ramp_inh signal in this case).

Optionally, in order to allow the ramp generator circuit 540 to use the normal startup mode of the voltage regulator when bypass mode is enabled before the voltage regulator is enabled, a regulator enable switch 58 may optionally be coupled in parallel with the current source 52 and includes a control node coupled to a gated flip-flop 50 through an inverter. For example, the gated flip-flop 50 may receive the input voltage VIN of the voltage regulator at a D input, a regulator enable signal (EN_REG) at a clock input (CLK), and a bypass mode activation signal bp_act at an enable input (EN). Meanwhile, the gated flip-flop 50 may output (at the Q output) a bypass first signal bp_before_en_act indicating whether bypass mode has been enabled before the regulator itself has been enabled.

As illustrated, the dropout transition control circuit 530 is configured to generate a ramping voltage at OUT to slowly turn on the ramp control element 42 when ramp_inh is low and bp_before_en_act is low (e.g., indicating that the ramp has been enabled, ramp_en=high). That is, the current source 52 charges the capacitor 63 which then produces the ramping voltage at OUT. Of course, other arrangements including alternative signaling arrangements are also possible as may be apparent to one of ordinary skill in the art.

Figure 6:
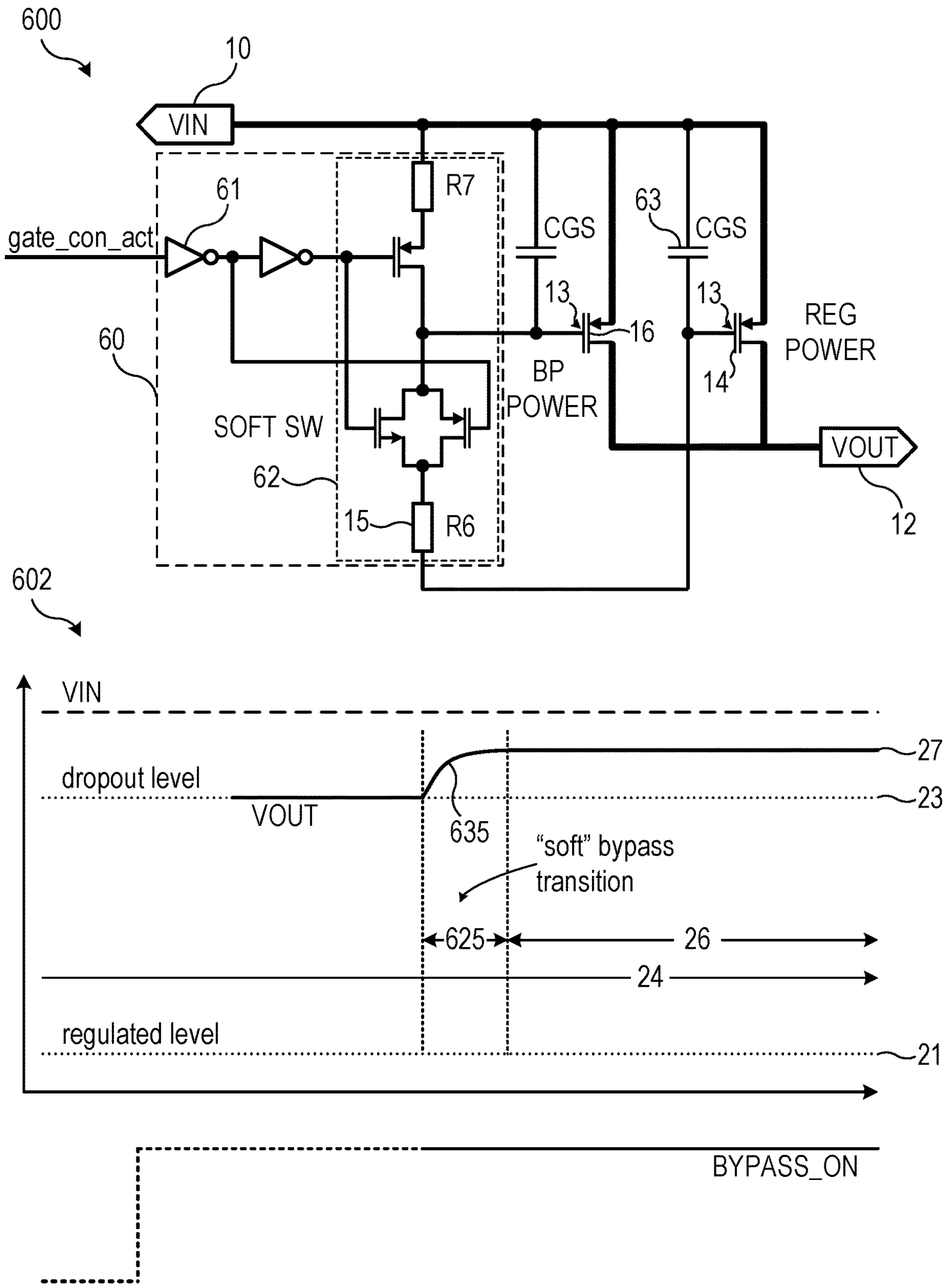
FIG. 6 illustrates an example voltage regulator circuit that includes a bypass transition control circuit including a bypass switch configured to provide a "soft" connection to activate bypass mode of the voltage regulator circuit and a corresponding qualitative graph showing output voltage of the voltage regulator circuit during a controlled bypass transition in accordance with embodiments of the invention.

FIG. 6 illustrates an example voltage regulator circuit that includes a bypass transition control circuit including a bypass switch configured to provide a “soft” connection to activate bypass mode of the voltage regulator circuit and a corresponding qualitative graph showing output voltage of the voltage regulator circuit during a controlled bypass transition in accordance with embodiments of the invention. The voltage regulator circuit of FIG. 3 may be a specific implementation of other voltage regulator circuits or combined with other voltage regulator circuits described herein. Similarly labeled elements may be as previously described.

Referring to FIG. 6, a voltage regulator circuit 600 includes a pass element 14 coupled between an input node 10 and an output node 12. Similar to previously described voltage regulator circuits, the voltage regulator circuit 600 also includes a bypass element 16 coupled in parallel with the pass element 14. The voltage regulator circuit 600 further includes a bypass transition control circuit 60 coupled between the control nodes of the pass element 14 and the bypass element 16 and the input node 10.

The bypass transition control circuit 60 is configured to manually transition the voltage regulator circuit 600 to bypass mode 26 as shown in corresponding qualitative graph 602. The bypass transition 625 may not be feasible before the voltage regulator circuit 600 is in dropout voltage level 23. For example, the voltage regulator circuit 600 may need to have no open-loop gain (as in dropout voltage level 23) before transitioning to bypass mode 26. The details of how the voltage regulator circuit 600 came to be in dropout mode 24 may not be important (as shown by the dashed line of BYPASS_ON prior to the bypass transition 625).

In various embodiments, the signal enabling bypass mode (e.g., BYPASS_ON) occurs prior to the bypass transition 625. In one embodiment, the bypass transition 625 is triggered by the voltage regulator circuit 600 detecting dropout mode 24 has been reached. Alternatively, the bypass transition 625 may be triggered directly using another signal (e.g., if the voltage regulator is already in dropout mode).

The bypass transition control circuit 60 may include a bypass switch 62 (e.g., a soft gate connection switch) that is coupled between the input node 10 and the control nodes of the pass element 14 and the bypass element 16. For example, as shown, the bypass switch 62 may include a pair of switching elements (shown here as a p-type MOSFET and an n-type MOSFET) coupled in parallel between the control nodes of the pass element 14 and the bypass element 16. The opposite transistor types may facilitate two-way switching of the bypass switch 62 in combination with one or more inverters.

The pair of switching elements may be controlled by a connection activation gate_con_act signal (e.g., a gate connection activation signal) and may be configured to connect the control nodes (e.g., the gates in the cast of FETs) through a resistor R6. The connection may be a soft connection that is controlled by the RC constant of the circuit. For example, the RC constant may depend on at least the resistance of R6 and the gate capacitance CGS of the pass element 14 and/or the bypass element 16. In this way, the RC constant can be predetermined in order provide the desired characteristics of the bypass transition voltage 635. The connection of the gates to VIN may be controlled using another switching element coupled between the control node of the bypass element 16 and VIN. Another resistor R7 may optionally be included in series.

Connecting the control nodes of the pass element 14 and the bypass element 16 may transition the voltage regulator circuit 600 into bypass mode 26. For example, prior to connecting the control nodes, the VOUT may be at the dropout voltage level 23 whereas VOUT transitions to the bypass voltage level 27 after the control nodes are connected. Once the voltage regulator circuit 600 is in dropout mode 24, the control node connection may begin immediately. Alternatively, the control node connection may be delayed for a predetermined length of time following the voltage regulator circuit 600 entering dropout mode 24.

Figure 7:
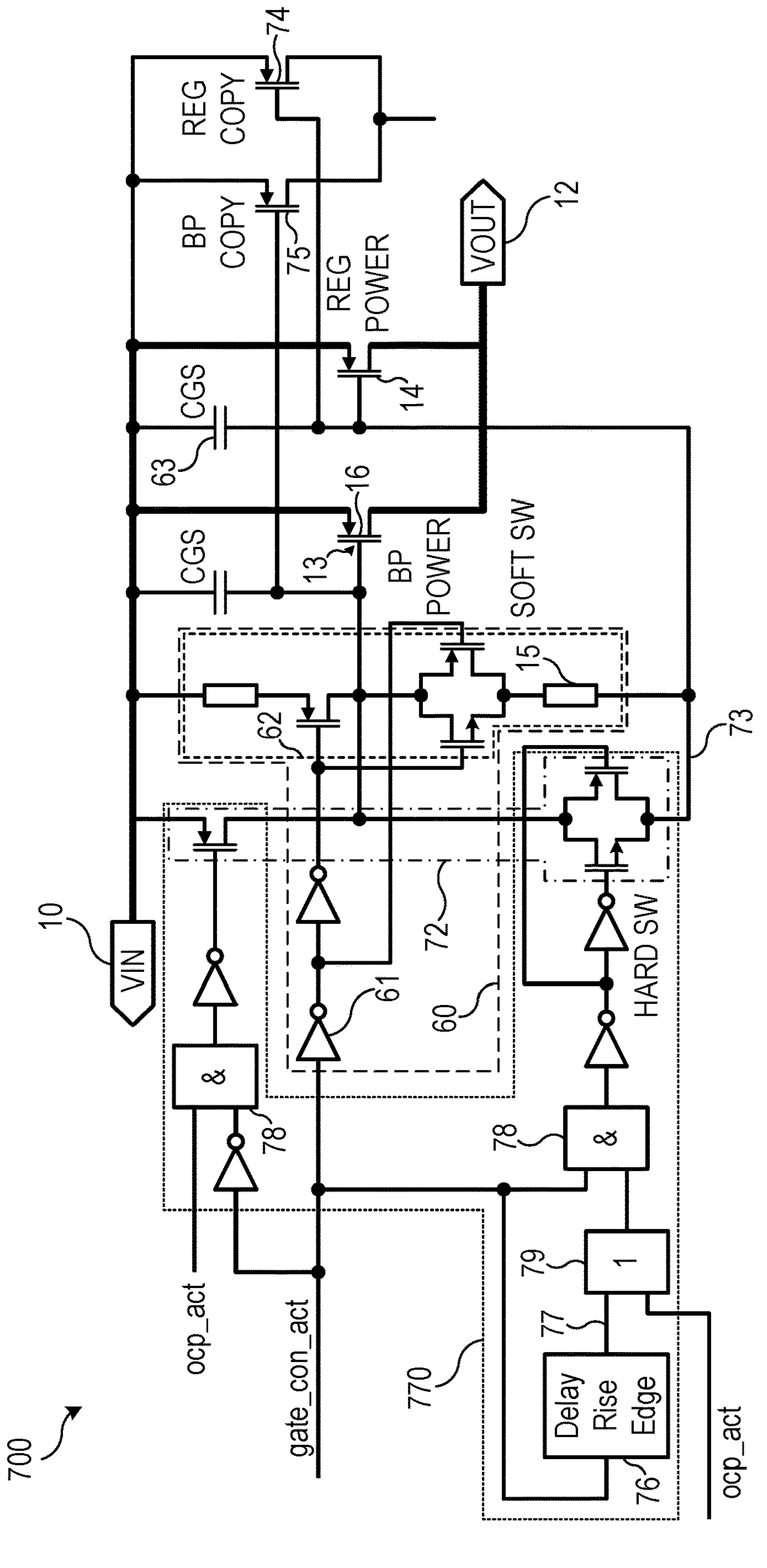
FIG. 7 illustrates an example voltage regulator circuit that includes a bypass transition control circuit and an overcurrent protection control circuit including an overcurrent protection switch configured to provide a "hard" connection during an overcurrent event in accordance with embodiments of the invention.

FIG. 7 illustrates an example voltage regulator circuit that includes a bypass transition control circuit and an overcurrent protection control circuit including an overcurrent protection switch configured to provide a "hard" connection during an overcurrent event in accordance with embodiments of the invention. The voltage regulator circuit of FIG. 7 may be a specific implementation of other voltage regulator circuits, such as the voltage regulator circuit of FIG. 6, for example, or combined with other voltage regulator circuits described herein. Similarly labeled elements may be as previously described.

Protection for overcurrent events may be unavailable in conventional voltage regulation circuits that allow manual activation of bypass mode. That is, during activation and deactivation of bypass mode, conventional voltage regulator circuits are not protected if an overcurrent event occurs. Referring to FIG. 7, a voltage regulator circuit 700 is similar to the voltage regulator circuit 600 of FIG. 6, except that it also includes an OCP control circuit 770 (not to be confused with OCP circuitry of the voltage regulator circuit 700 which may already be present). In contrast to conventional circuits, the bypass transition control circuit 60 of the voltage regulator circuit 700 allows manual activation and deactivation of bypass mode while the OCP control circuit 770 is configured to provide OCP functionality (e.g., using existing OCP circuitry) throughout the bypass transition.

The voltage regulator circuit 700 also includes an OCP pass element 74 and an OCP bypass element 75 coupled in parallel. The control node of the OCP pass element 74 is coupled to the control node of the pass element 14 while the control node of the OCP bypass element 75 is coupled to the control node of the bypass element 16. In various embodiments, the OCP pass element 74 and the OCP bypass element 75 are copy transistors corresponding to pass element 14 and bypass element 16, also implemented as transistors. The OCP pass element 74 and the OCP bypass element 75 may be configured to provide protection to the components of the voltage regulator circuit 700 during overcurrent events during regulation mode while the OCP control circuit 770 expands this functionality to also include the transition to and from bypass mode.

The maximal allowed load current is the limitation current (ILIM). When the additional pass element (i.e., bypass element 16) is connected, ILIM increases and the additional copy pass element (OCP bypass element 75) should be connected as well. The OCP bypass element 75 is of appropriate size to provide OCP functionality with the bypass element 16 is turned on. However, this only provides OCP functionality during the regulation mode and the bypass mode, and not during the transitions between.

The OCP control circuit 770 includes an OCP switch 72 that is configured to provide a low resistance connection 73 between the control nodes of the pass element 14 and the bypass element 16. Different from the bypass switch 62, which uses resistance to create a soft control node connection (e.g., soft gate connection), the low resistance connection 73 is a hard control node connection (e.g., hard gate connection) configured to fully connect the control nodes with little or no lag time. For example, a two-way switch may be connected to an OCP activation signal ocp_act. The two-way switch may turn on when ocp_act is "1". Similarly, a switch may be included in the OCP control circuit 770 coupled between the input node 10 and the control nodes. This switch may also turn on when ocp_act is "1".

The OCP control circuit 770 is configured to provide protection when an overcurrent event occurs (ocp_act) during connection of the control nodes of the pass element 14 and the bypass element 16 to activate bypass mode (gate_con_act). An AND gate 78 and appropriate inverters are included to turn the switch between the input node 10 and the control nodes on when ocp_act is "1" and gate_con_act="1". This occurs immediately once the condition is met.

However, the two-way switch connecting the control nodes themselves is configured to turn on after the transition to bypass mode is complete. Specifically, a rising edge delay 76 is included that delays the rising edge of gate_con_act causing a delay signal 77 (e.g., a delay triggered by the activation of the bypass mode). The delay signal 77 and ocp_act are inputs to an XOR gate 79, which has an output coupled to an AND gate 78 coupled to gate_con_act.

It may be advantageous to introduce low resistance between the control nodes (e.g., gates). For example, the OCP control circuit 770 controls the control node of the pass element 14 (e.g., the power MOSFET of the voltage regulator circuit 700). It may be important for the control node of the OCP pass element 74 (e.g., additional power MOSFET) to not "lag" due to high resistance. Consequently, a "hard" connection (e.g., a hard gate connection) is used. That is, the hard switch is activated immediately after receiving an overcurrent event signal.

However, if the overcurrent event occurs during the soft connection of the control nodes (e.g., gates), low resistance may be better introduced when the soft connection of the gates ends. Therefore, a "hard" connection (e.g., a hard gate connection) may be made based on timer (e.g., using the rising edge delay 76). In other words, the hard switch is also activated after specified delay time that is at least as long as the soft connection of the gates of pass and bypass elements. In this case the OCP switch 72 may be considered a delayed hard gate connection switch. In the reverse situation, if the overcurrent event occurs during the soft disconnecting of the control nodes (e.g., gates), the control node of the OCP bypass element 75 should be coupled to VIN immediately.

Figure 8:
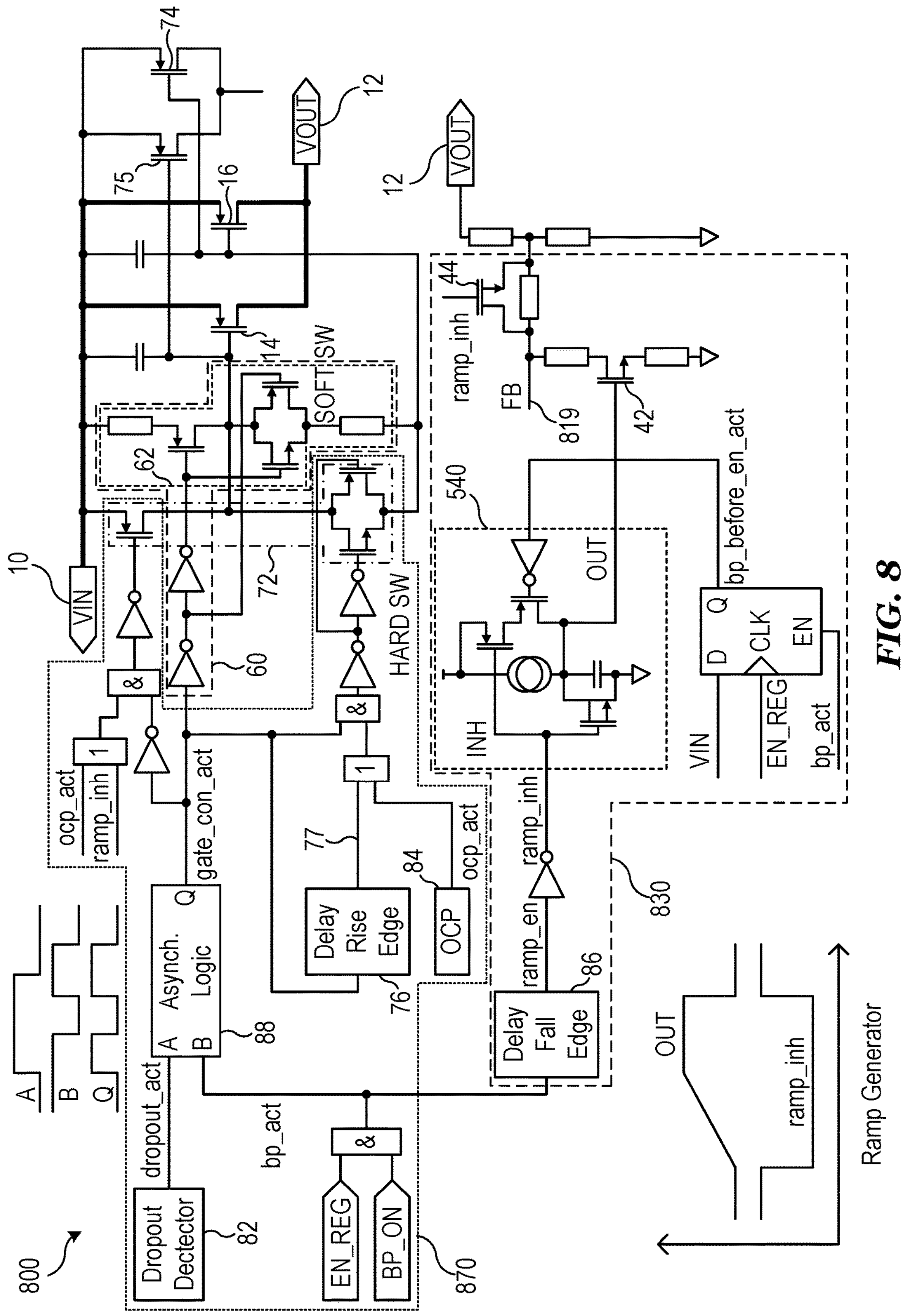
FIG. 8 illustrates another example voltage regulator circuit that includes a dropout transition control circuit, a bypass transition control circuit and an overcurrent protection control circuit in accordance with embodiments of the invention.

FIG. 8 illustrates another example voltage regulator circuit that includes a dropout transition control circuit, a bypass transition control circuit and an overcurrent protection control circuit in accordance with embodiments of the invention. The voltage regulator circuit of FIG. 8 may be a specific implementation of other voltage regulator circuits, such as the voltage regulator circuit of FIG. 7, for example, or combined with other voltage regulator circuits described herein. Similarly labeled elements may be as previously described.

Referring to FIG. 8, a voltage regulator circuit 800 is similar to the voltage regulator circuit 700 of FIG. 7 except additional components making up an OCP control circuit 870 have been included to demonstrate an example configuration of a voltage regulator circuit that includes both a bypass transition control circuit 60 and a dropout transition control circuit 830. Asynchronous logic 88 is included to facilitate the soft connection of the control nodes (using the bypass transition control circuit 60) when dropout mode is detected by a dropout detector 82. That is, the dropout detector 82 is configured to detect that the voltage regulator circuit 800 is in dropout mode and generate a corresponding signal.

Dropout mode is manually activated using BP_ON and EN_REG signals as inputs to an AND gate that outputs to both a falling edge delay 86 that generates ramp_enh as an output and to the asynchronous logic 88. The ramp_enh signal is inverted to generate the ramp_inh signal and provided to a ramp generator circuit 540.

After an overcurrent event the resistance of the feedback network may be set back to the normal value. After the bypass mode is already activated, (e.g., the gates of the pass elements are connected together), the bypass mode can be also turned off manually by setting the signal BP_EN="0". In that case, the sequence is reversed when comparing to the activation sequence: Firstly, the gates of the pass and bypass elements are disconnected, again, in a soft manner, then after a defined time delay, that covers the time needed for soft disconnection of the gates (falling edge delay 86), the resistance of the feedback network may be set back to the normal value. This may be performed in a "hard" switching manner (i.e. without regard to potential inrush currents). The voltage regulator circuit 800 will then return to normal regulation mode and (provided the voltage regulator is not a push-pull type) VOUT may be discharged through load resistance (e.g., over a period of time).

The voltage regulator circuit 800 demonstrates one example of how several control circuits (the dropout transition control circuit 830, the bypass transition control circuit 60, and the OCP control circuit 870, for instance) may be implemented in a single voltage regulator circuit. However, various aspects of the control circuits may be altered to suit specific applications as may be apparent to those of skill in the art. For example, although generally advantageous, the OCP functionality may be omitted while still retaining both the dropout transition control and the bypass transition control (e.g., still generating VOUT transition voltage curves such as shown FIG. 2 and others, but without OCP functionality).

Figure 9:
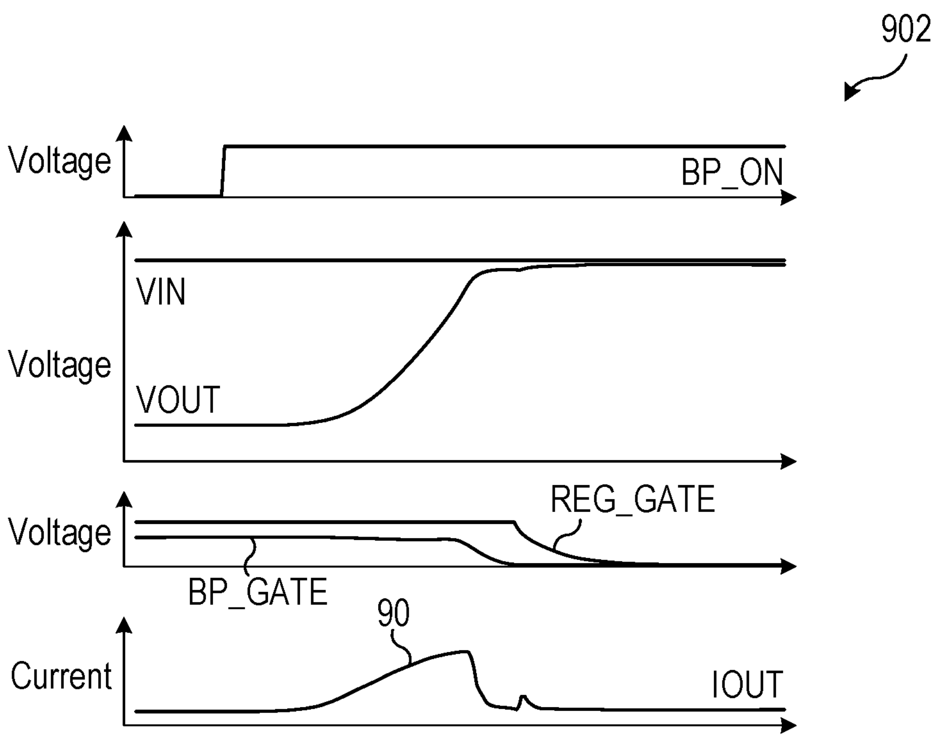
FIG. 9 illustrates an example qualitative graph showing various voltages and the output current of a voltage regulator during a controlled transition from regulation mode to bypass mode of the voltage regulator in accordance with embodiments of the invention.

FIG. 9 illustrates an example qualitative graph showing various voltages and the output current of a voltage regulator during a controlled transition from regulation mode to bypass mode of the voltage regulator in accordance with embodiments of the invention. The qualitative graph of FIG. 9 may be a qualitative representation of the behavior of various voltage regulators (i.e. voltage regulation circuits) described herein, such as the voltage regulator circuit of FIG. 8, for example. Similarly labeled elements may be as previously described.

Referring to FIG. 9, a qualitative graph 902 shows the input voltage VIN and the output voltage VOUT of a voltage regulator after bypass mode is manually enabled using the BP_ON signal. Initially, the voltage regulator is in regulation mode and VOUT is at the regulated output voltage. After BP_ON becomes high, control circuitry (e.g., a dropout transition control circuit including a ramp generator circuit) facilitates a controlled transition of VOUT from the regulated output voltage to a dropout voltage level (dropout mode). The output current IOUT is shown to illustrate the inrush current 90 during transitions. Here, the inrush current 90 rises, but is limited during the transition.

After the voltage regulator is in dropout mode, control circuitry (e.g., a bypass transition control circuit including a soft gate connection switch) facilitates a controlled transition of VOUT from the dropout voltage level to a bypass voltage level (e.g., close to VIN) and the voltage regulator is in bypass mode. Again, the inrush current 90 rises briefly, but is limited during the transition.

Figure 10:
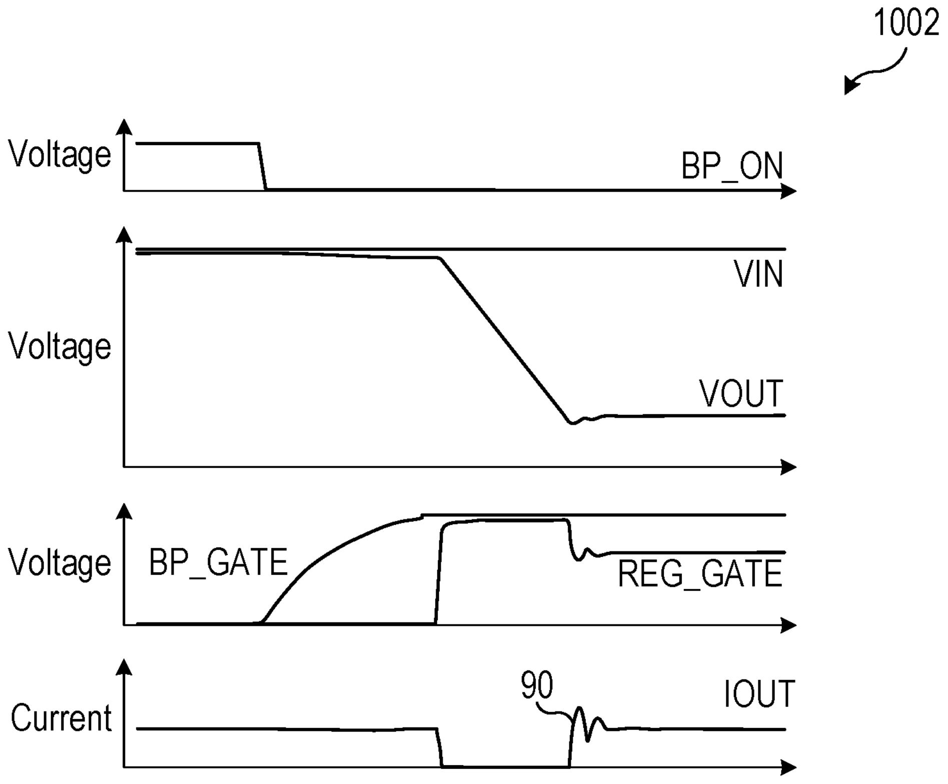
FIG. 10 illustrates an example qualitative graph showing various voltages and the output current of a voltage regulator during a controlled transition from bypass mode to regulation mode of the voltage regulator in accordance with embodiments of the invention.

Bypass mode can also be manually turned off to return the voltage regulator to normal regulation mode operation. FIG. 10 illustrates an example qualitative graph showing various voltages and the output current of a voltage regulator during a controlled transition from bypass mode to regulation mode of the voltage regulator in accordance with embodiments of the invention. The qualitative graph of FIG. 10 may be a qualitative representation of the behavior of various voltage regulators (i.e. voltage regulation circuits) described herein, such as the voltage regulator circuit of FIG. 8, for example. Similarly labeled elements may be as previously described.

Referring to FIG. 10, a qualitative graph 1002 shows VOUT being at a bypass voltage level while the BP_ON signal is high indicating that the voltage regulator is in bypass mode. Once BP_ON is made low, control circuitry (e.g., a bypass transition control circuit including a soft gate connection switch) facilitates a controlled transition to the dropout voltage level (e.g., by performing a soft disconnect of the gates of a pass transistor and a bypass transistor). As shown, this transition has little effect on the inrush current 90.

Once in dropout mode, control circuitry (e.g., a dropout transition control circuit including a ramp generator circuit) facilitates a controlled transition of VOUT to the regulated voltage level. The output current IOUT drops to zero during the voltage ramp and then the inrush current 90 increases as the voltage regulator settles back into regulation mode. Again, the inrush current 90 is limited by the controlled transitions.

Figure 11:
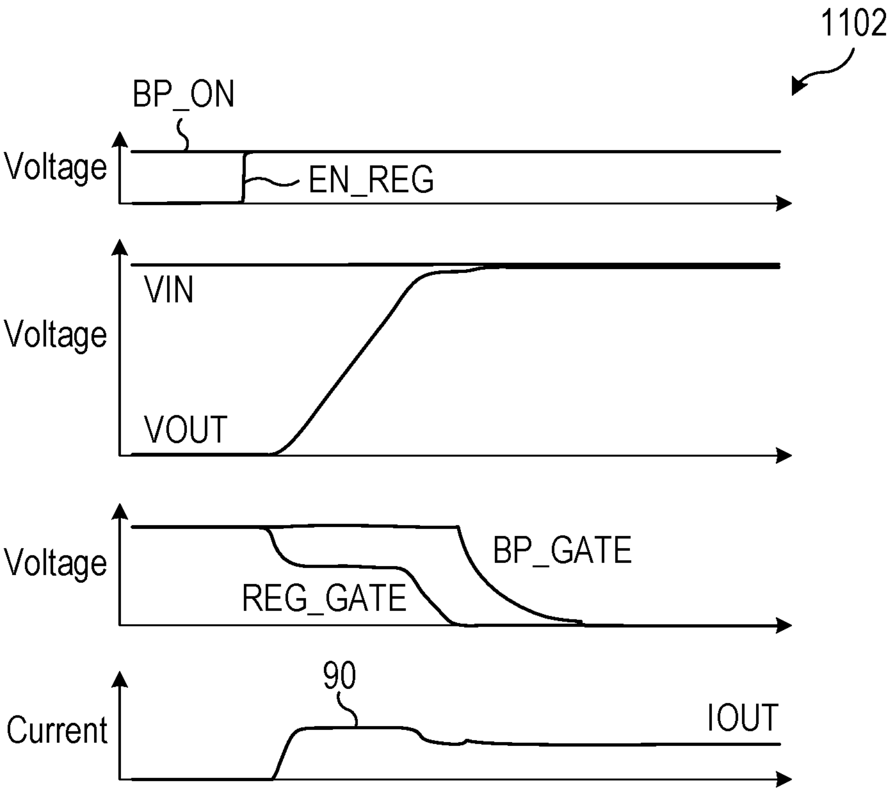
FIG. 11 illustrates another example qualitative graph showing various voltages and the output current of a voltage regulator during a controlled transition from bypass mode to regulation mode of the voltage regulator when the bypass mode is enabled before the voltage regulator is enabled in accordance with embodiments of the invention.

Bypass mode may also be set before the voltage regulator is enabled. FIG. 11 illustrates another example qualitative graph showing various voltages and the output current of a voltage regulator during a controlled transition from bypass mode to regulation mode of the voltage regulator when the bypass mode is enabled before the voltage regulator is enabled in accordance with embodiments of the invention. The qualitative graph of FIG. 11 may be a qualitative representation of the behavior of various voltage regulators (i.e. voltage regulation circuits) described herein, such as the voltage regulator circuit of FIG. 8, for example. Similarly labeled elements may be as previously described.

Referring to FIG. 11, a qualitative graph 1102 shows that BP_ON is initially high while EN_REG is low indicating that the bypass mode of the voltage regulator is enabled, but the voltage regulator itself is not enabled. Consequently, the voltage regulator receives the input voltage VIN and there is no output voltage VOUT. In this scenario, it is possible to barely turn on a ramp control element (e.g., a transistor acting as a switch in a feedback network of a dropout transition control circuit coupled to a feedback divider) so that a soft start is provided by the voltage regulator's soft start implementation itself. The soft start ramp can be tuned to have the desired characteristics.

As shown, once the voltage regulator is enabled, VOUT is ramped in a controlled transition from zero to a dropout voltage level and then a controlled transition to bypass mode is performed. As before, the inrush current 90 has two peaks corresponding to the transition to dropout mode and to bypass mode respectively, but the inrush current 90 is limited by the controlled transitions. In contrast, to the transition from regulation mode to dropout mode shown in qualitative graph 902, the transition from zero to dropout mode here broadens the peak of the inrush current 90, but the behavior of the output current IOUT is otherwise analogous.

Figure 12:
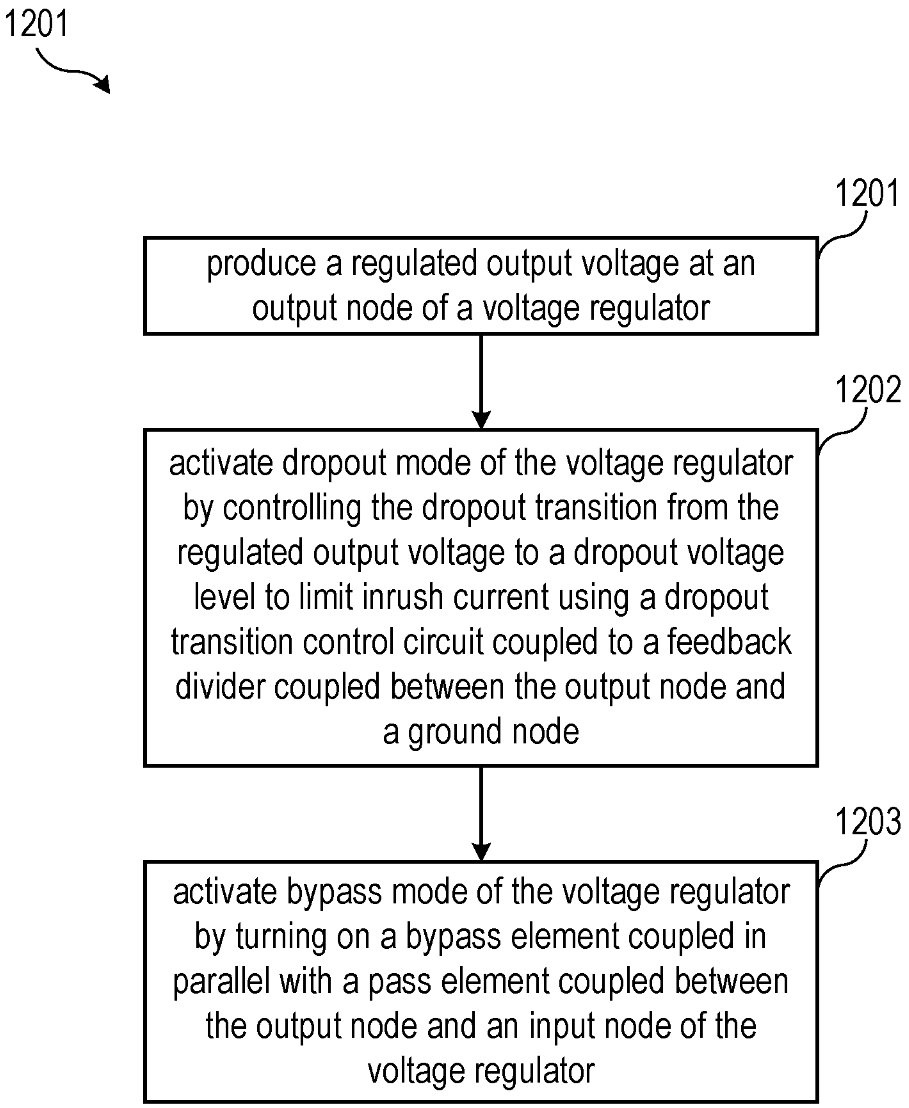
FIG. 12 illustrates an example method of activating bypass mode of a voltage regulator in accordance with embodiments of the invention.

FIG. 12 illustrates an example method of activating bypass mode of a voltage regulator in accordance with embodiments of the invention. The method of FIG. 12 may be combined with other methods and performed using the systems and apparatuses as described herein. For example, the method of FIG. 12 may be combined with any of the embodiments of FIGS. 1-11. Although shown in a logical order, the arrangement and numbering of the steps of FIG. 12 are not intended to be limited. The method steps of FIG. 12 may be performed in any suitable order or concurrently with one another as may be apparent to a person of skill in the art.

Referring to FIG. 12, a method 1209 of activating bypass mode of a voltage regulator includes a step 1201 of producing a regulated output voltage at an output node of a voltage regulator. Dropout mode of the voltage regulator is then activated in step 1202 by controlling a dropout transition from the regulated output voltage to a dropout voltage level to limit inrush current using a dropout transition control circuit coupled to a feedback divider coupled between the output node and a ground node. In step 1203, the bypass mode is of the voltage regulator is activated by turning on a bypass element coupled in parallel with a pass element coupled between the output node and an input node of the voltage regulator.

Example embodiments of the invention are summarized here. Other embodiments can also be understood from the entirety of the specification as well as the claims filed herein.

Example 1. A voltage regulator circuit including: an input node configured to receive an input voltage; an output node configured to produce a regulated output voltage; a pass element coupled between the input node and the output node; a bypass element coupled in parallel with the pass element; a feedback divider coupled between the output node and a ground node, the feedback divider being configured to produce a feedback signal indicative of the regulated output voltage; an error amplifier circuit coupled between a control node of the pass element and the feedback divider, the error amplifier circuit being configured to minimize a voltage difference between a reference voltage and the feedback signal; and a dropout transition control circuit coupled to the feedback divider and configured to activate a dropout mode of the voltage regulator circuit by controlling a dropout transition at the output node from the regulated output voltage to a dropout voltage level to limit inrush current.

Example 2. The voltage regulator circuit of example 1, where the dropout transition control circuit is further configured to activate the dropout mode by causing the dropout transition to be a substantially linear voltage curve to limit the inrush current.

Example 3. The voltage regulator circuit of one of examples 1 and 2, further including: a bypass transition control circuit including a bypass switch coupled between the control node of the pass element and a control node of the bypass element, the bypass switch being configured to activate a bypass mode of the voltage regulator circuit by controlling a bypass transition from the dropout voltage level to a bypass voltage level at the output node to further limit the inrush current.

Example 4. The voltage regulator circuit of example 3, where the bypass switch is further configured to activate the bypass mode by causing the bypass transition to be a substantially exponential voltage curve approaching the bypass voltage level to further limit the inrush current.

Example 5. The voltage regulator circuit of example 4, where the bypass transition control circuit further includes a resistor coupled between the control nodes of the pass element and the bypass element, and where the substantially exponential voltage curve is controlled according to an RC constant determined by the resistor and a capacitance between the control nodes and the input node.

Example 6. The voltage regulator circuit of example 5, where the pass element and the bypass element are field-effect transistors, the control nodes of the pass element and the bypass element being gates, and where the capacitance is gate capacitance.

Example 7. The voltage regulator circuit of one of examples 3 to 6, where the bypass transition control circuit is configured to trigger the bypass switch in response to detecting that the voltage regulator circuit is in the dropout mode.

Example 8. The voltage regulator circuit of one of examples 3 to 7, further including an overcurrent protection (OCP) control circuit including an OCP switch coupled between the control nodes of the pass element and the bypass element, the OCP switch being configured to provide a low resistance connection between the control nodes immediately during an overcurrent event or after a delay triggered by the activation of the bypass mode.

Example 9. A method of activating a bypass mode of a voltage regulator, the method including: producing a regulated output voltage at an output node of a voltage regulator; activating a dropout mode of the voltage regulator by controlling a dropout transition from the regulated output voltage to a dropout voltage level to limit inrush current using a dropout transition control circuit coupled to a feedback divider coupled between the output node and a ground node; and activating a bypass mode of the voltage regulator by turning on a bypass element coupled in parallel with a pass element coupled between the output node and an input node of the voltage regulator.

Example 10. The method of example 9, where activating the dropout mode includes causing the dropout transition to be a substantially linear voltage curve to limit the inrush current.

Example 11. The method of one of examples 9 and 10, where activating the bypass mode includes connecting the control nodes of the pass element and the bypass element while controlling a bypass transition from the dropout voltage level to a bypass voltage level to limit the inrush current using a bypass transition control circuit coupled between the control nodes.

Example 12. The method of example 11, further including: deactivating the bypass mode by disconnecting the control nodes of the pass element and the bypass element while controlling the bypass transition from the bypass voltage level to the dropout voltage level to further limit the inrush current using the bypass transition control circuit; and activating a regulation mode of the voltage regulator by controlling the dropout transition from the dropout voltage level to the regulated output voltage to further limit the inrush current using the dropout transition control circuit.

Example 13. The method of one of examples 11 and 12, where activating the bypass mode further includes causing the dropout transition to be a substantially exponential voltage curve approaching the bypass voltage level to further limit the inrush current.

Example 14. The method of example 13, where the substantially exponential voltage curve is controlled according to a predetermined RC constant.

Example 15. The method of one of examples 9 to 14, further including: providing a low resistance connection between control nodes of the pass element and the bypass element immediately during an overcurrent event or after a delay triggered by the activation of the bypass mode.

Example 16. The method of one of examples 9 to 15, further including: providing a bypass mode activation signal before activating the dropout mode, the bypass mode activation signal initiating activating the dropout mode; and initiating activating the bypass mode in response to the bypass mode activation signal and to detecting that the voltage regulator is in the dropout mode.

Example 17. The method of example 16, further including: enabling the bypass mode of the voltage regulator prior to enabling a regulation mode of the voltage regulator.

Example 18. The method of one of examples 9 to 17, further including: providing a low resistance connection between the control nodes of the pass element and the bypass element immediately during an overcurrent event or after a delay triggered triggering by the activation of the bypass mode.

Example 19. A voltage regulator circuit including: an input node configured to receive an input voltage; an output node configured to produce a regulated output voltage; a pass element and a bypass element coupled in parallel between the input node and the output node; an overcurrent protection (OCP) pass element and an OCP bypass element coupled to the input node in parallel, a control node of the OCP pass element being coupled to a control node of the pass element, and a control node of the OCP bypass element being coupled to a control node of the bypass element; a bypass transition control circuit including a soft gate connection switch coupled between the control node of the pass element and the control node of the bypass element, the soft gate connection switch being configured to activate a bypass mode of the voltage regulator circuit by controlling a bypass transition at the output node to limit inrush current while turning on the bypass element; and an OCP control circuit including a delayed hard gate connection switch coupled between the control node of the pass element and the control node of the bypass element, the delayed hard gate connection switch being configured to provide a low resistance connection between the control nodes immediately during an overcurrent event or after a delay triggered by the activation of the bypass mode.

Example 20. The voltage regulator circuit of example 19, further including: a feedback divider coupled between the output node and a ground node, the feedback divider being configured to produce a feedback signal indicative of the regulated output voltage, an error amplifier circuit coupled between the control node of the pass element and the feedback divider, the error amplifier circuit being configured to compare a reference voltage to the feedback signal, and a dropout transition control circuit coupled to the feedback divider and configured to activate a dropout mode of the voltage regulator circuit by controlling a dropout transition at the output node from the regulated output voltage to a dropout voltage level to further limit the inrush current.

Example 21. The voltage regulator circuit of example 20, where the dropout transition control circuit is further configured to activate the dropout mode by causing the dropout transition to be a substantially linear voltage curve to further limit the inrush current.

Example 22. The voltage regulator circuit of one of examples 19 to 21, where the soft gate connection switch is further configured to activate the bypass mode by causing the bypass transition to be a substantially exponential voltage curve approaching a bypass voltage level to further limit the inrush current.

Example 23. The voltage regulator circuit of example 22, where the bypass transition is from a dropout voltage level to the bypass voltage level.

Example 24. The voltage regulator circuit of one of examples 19 to 23, where the bypass transition control circuit is configured to trigger the soft gate connection switch in response to detecting that the voltage regulator circuit is in a dropout mode.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A voltage regulator circuit comprising:

an input node configured to receive an input voltage;

an output node configured to produce a regulated output voltage;

a pass element coupled between the input node and the output node;

a bypass element coupled in parallel with the pass element;

a feedback divider coupled between the output node and a ground node, the feedback divider being configured to produce a divider signal indicative of the regulated output voltage;

an error amplifier circuit coupled between a control node of the pass element and the feedback divider, the error amplifier circuit being configured to minimize a voltage difference between a reference voltage and a feedback signal; and a dropout transition control circuit coupled between the feedback divider and the error amplifier circuit, the dropout transition control circuit being configured to generate the feedback signal using the divider signal from the feedback divider and configured to activate a dropout mode of the voltage regulator circuit by controlling a dropout transition at the output node from the regulated output voltage to a dropout voltage level to limit inrush current.

2. The voltage regulator circuit of claim 1, wherein the dropout transition control circuit is further configured to activate the dropout mode by causing the dropout transition to be a substantially linear voltage curve to limit the inrush current.

3. The voltage regulator circuit of claim 1, further comprising:

a bypass transition control circuit comprising a bypass switch coupled between the control node of the pass element and a control node of the bypass element, the bypass switch being configured to activate a bypass mode of the voltage regulator circuit by controlling a bypass transition from the dropout voltage level to a bypass voltage level at the output node to further limit the inrush current.

4. The voltage regulator circuit of claim 3, wherein the bypass switch is further configured to activate the bypass mode by causing the bypass transition to be a substantially exponential voltage curve approaching the bypass voltage level to further limit the inrush current.

5. The voltage regulator circuit of claim 4, wherein the bypass transition control circuit further comprises a resistor coupled between the control nodes of the pass element and the bypass element, and wherein the substantially exponential voltage curve is controlled according to an RC constant determined by the resistor and a capacitance between the control nodes and the input node.

6. The voltage regulator circuit of claim 3, wherein the bypass transition control circuit is configured to trigger the bypass switch in response to detecting that the voltage regulator circuit is in the dropout mode.

7. The voltage regulator circuit of claim 3, further comprising an overcurrent protection (OCP) control circuit comprising an OCP switch coupled between the control nodes of the pass element and the bypass element, the OCP switch being configured to provide a low resistance connection between the control nodes immediately during an overcurrent event or after a delay triggered by the activation of the bypass mode.

8. A method of activating a bypass mode of a voltage regulator, the method comprising:

producing a regulated output voltage at an output node of the voltage regulator;

activating a dropout mode of the voltage regulator by controlling a dropout transition from the regulated output voltage to a dropout voltage level to limit inrush current using a dropout transition control circuit coupled between a feedback divider and an error amplifier circuit, the dropout transition control circuit being configured to generate a feedback signal using a divider signal from the feedback divider, the feedback divider being coupled between the output node and a ground node; and activating the bypass mode of the voltage regulator by turning on a bypass element coupled in parallel with a pass element coupled between the output node and an input node of the voltage regulator.

9. The method of claim 8, wherein activating the dropout mode comprises causing the dropout transition to be a substantially linear voltage curve to limit the inrush current.

10. The method of claim 8, wherein activating the bypass mode comprises connecting control nodes of the pass element and the bypass element while controlling a bypass transition from the dropout voltage level to a bypass voltage level to limit the inrush current using a bypass transition control circuit coupled between the control nodes.

11. The method of claim 10, further comprising:

deactivating the bypass mode by disconnecting the control nodes of the pass element and the bypass element while controlling the bypass transition from the bypass voltage level to the dropout voltage level to further limit the inrush current using the bypass transition control circuit; and activating a regulation mode of the voltage regulator by controlling the dropout transition from the dropout voltage level to the regulated output voltage to further limit the inrush current using the dropout transition control circuit.

12. The method of claim 8, further comprising:

providing a low resistance connection between control nodes of the pass element and the bypass element immediately during an overcurrent event or after a delay triggered by the activation of the bypass mode.

13. The method of claim 8, further comprising:

providing a bypass mode activation signal before activating the dropout mode, the bypass mode activation signal initiating activating the dropout mode; and initiating activating the bypass mode in response to the bypass mode activation signal and to detecting that the voltage regulator is in the dropout mode.

14. The method of claim 8, further comprising:

providing a low resistance connection between control nodes of the pass element and the bypass element immediately during an overcurrent event or after a delay triggered by the activation of the bypass mode.

15. A voltage regulator circuit comprising:

an input node configured to receive an input voltage;

an output node configured to produce a regulated output voltage;

a pass element and a bypass element coupled in parallel between the input node and the output node;

an overcurrent protection (OCP) pass element and an OCP bypass element coupled to the input node in parallel, a control node of the OCP pass element being coupled to a control node of the pass element, and a control node of the OCP bypass element being coupled to a control node of the bypass element;

a bypass transition control circuit comprising a soft gate connection switch coupled between the control node of the pass element and the control node of the bypass element, the soft gate connection switch being configured to activate a bypass mode of the voltage regulator circuit by controlling a bypass transition at the output node to limit inrush current while turning on the bypass element; and an OCP control circuit comprising a delayed hard gate connection switch coupled between the control node of the pass element and the control node of the bypass element, the delayed hard gate connection switch being configured to provide a low resistance connection between the control nodes immediately during an over-current event or after a delay triggered by the activation of the bypass mode.

16. The voltage regulator circuit of claim 15, further comprising:

a feedback divider coupled between the output node and a ground node, the feedback divider being configured to produce a feedback signal indicative of the regulated output voltage, an error amplifier circuit coupled between the control node of the pass element and the feedback divider, the error amplifier circuit being configured to compare a reference voltage to the feedback signal, and a dropout transition control circuit coupled to the feedback divider and configured to activate a dropout mode of the voltage regulator circuit by controlling a dropout transition at the output node from the regulated output voltage to a dropout voltage level to further limit the inrush current.

17. The voltage regulator circuit of claim 16, wherein the dropout transition control circuit is further configured to activate the dropout mode by causing the dropout transition to be a substantially linear voltage curve to further limit the inrush current.

18. The voltage regulator circuit of claim 15, wherein the soft gate connection switch is further configured to activate the bypass mode by causing the bypass transition to be a substantially exponential voltage curve approaching a bypass voltage level to further limit the inrush current.

19. The voltage regulator circuit of claim 18, wherein the bypass transition is from a dropout voltage level to the bypass voltage level.

20. The voltage regulator circuit of claim 15, wherein the bypass transition control circuit is configured to trigger the soft gate connection switch in response to detecting that the voltage regulator circuit is in a dropout mode.

* * * * *